United States Patent
Jeon et al.

(10) Patent No.: US 7,359,766 B2
(45) Date of Patent: *Apr. 15, 2008

(54) ROBOT CLEANER AND OPERATING METHOD THEREOF

(75) Inventors: Hyeong-Shin Jeon, Gyeonggi-Do (KR); Hyoung-Bin Im, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 746 days.

This patent is subject to a terminal disclaimer.

(21) Appl. No.: 10/837,666

(22) Filed: May 4, 2004

(65) Prior Publication Data

US 2005/0137749 A1    Jun. 23, 2005

(30) Foreign Application Priority Data

Dec. 22, 2003    (KR) .................. 10-2003-0094957

(51) Int. Cl.
*G06F 19/00* (2006.01)

(52) U.S. Cl. .............. 700/245; 700/259; 700/246; 700/260; 700/256; 318/568.1; 318/568.12; 318/580; 318/581; 318/587; 901/1; 901/46; 901/47; 15/319

(58) Field of Classification Search ............. 700/259, 700/245, 246, 249, 250, 256, 261; 318/568.1, 318/568.12, 580, 581, 587; 701/23, 24, 25, 701/26, 300, 301; 901/1, 46, 47; 15/319
See application file for complete search history.

(56) References Cited

U.S. PATENT DOCUMENTS

| | | | |
|---|---|---|---|
| 4,674,048 A | 6/1987 | Okumura | |
| 5,440,216 A * | 8/1995 | Kim | 318/587 |
| 5,613,261 A | 3/1997 | Kawakami et al. | |
| 5,764,014 A | 6/1998 | Jakeway et al. | |
| 7,079,923 B2 * | 7/2006 | Abramson et al. | 700/245 |
| 7,113,847 B2 * | 9/2006 | Chmura et al. | 700/245 |
| 7,167,775 B2 * | 1/2007 | Abramson et al. | 700/245 |
| 2004/0016077 A1 * | 1/2004 | Song et al. | 15/319 |

FOREIGN PATENT DOCUMENTS

| | | |
|---|---|---|
| CN | 2510249 Y | 9/2002 |
| EP | 0142594 | 5/1985 |

(Continued)

OTHER PUBLICATIONS

An English language Abstract of German Patent Publication No. DE 3737845.

(Continued)

*Primary Examiner*—Thomas Black
*Assistant Examiner*—McDieunel Marc
(74) *Attorney, Agent, or Firm*—Greenblum & Bernstein, P.L.C.

(57) ABSTRACT

A robot cleaner comprises a suction unit installed within a cleaner body, for sucking dirt on a floor; a driving unit for moving the cleaner body; a wheel installed at a bottom of the cleaner body to be contacted with the floor, and rotated by movement of the cleaner body; a detecting unit for detecting whether the wheel is rotated; and a control unit for controlling the driving unit in response to signal from the detecting unit. Accordingly, the robot cleaner can smoothly and continuously carry out a cleaning operation, even when the robot cleaner is abnormally stopped due to an obstacle which is not previously recognized in traveling.

8 Claims, 3 Drawing Sheets

FOREIGN PATENT DOCUMENTS

| | | |
|---|---|---|
| FR | 2606178 | 5/1988 |
| JP | 5-23272 | 2/1993 |
| JP | 6-078863 | 3/1994 |
| JP | 6-343583 | 12/1994 |
| JP | 8-000517 | 1/1996 |
| JP | 2002-360482 | 12/2002 |
| KR | 2000 0002315 | 1/2000 |

OTHER PUBLICATIONS

English language Abstract of JP 5-23272.
English language Abstract of Korean 2000-0002315.
English Language Abstract of JP 6-078863.
English language Abstract of JP 2002-360482.
English language Abstract of JP 6-343583.
English language Abstract of JP 8-000517.

* cited by examiner

ROBOT CLEANER AND OPERATING METHOD THEREOF

BACKGROUND OF THE INVENTION

1. Field of the Invention

The present invention relates to a robot cleaner and its operating method, and more particularly, to a robot cleaner and its operating method capable of smoothly performing a cleaning operation by properly taking a step when the cleaner abnormally travels because of an obstacle or the like while cleaning with self-moving.

2. Description of the Background Art

In general, a robot cleaner is a machine that detects a cleaning zone by itself, an obstacle or the like without operation of a user, cleans while moving by itself, moves to a charging station by itself when power of a battery is consumed, to be charged, and returns to a cleaning zone when the charging is completed, to perform a cleaning operation.

A conventional robot cleaner comprises a suction unit for sucking dirt on a floor; a driving wheel connected to a driving motor in order to move the robot cleaner in a moving direction; a plurality of auxiliary wheels for supporting the cleaner on the floor; a navigation sensor for determining positions of cleaner, obstacles and the like; and a control unit for automatically controlling a cleaner. Such a cleaner performs a cleaning operation by moving according to a preset pattern, and an encoder connected to the driving wheel detects a rotation state of the driving wheel to thereby determine a traveling state of the cleaner.

However, the conventional robot cleaner has following problem.

Even when the conventional robot cleaner does not normally travel due to an obstacle or the like while cleaning or moving, since the driving wheel is slidingly rotated on the floor, the encoder recognizes that a rotation of the driving wheel is normal, and the control unit also determines that the cleaner is normally operated. Accordingly, it is impossible to take a step for abnormal traveling of the cleaner, whereby a cleaning operation is not properly performed.

SUMMARY OF THE INVENTION

Therefore, an object of the present invention is to provide a robot cleaner and its operating method capable of smoothly performing a cleaning operation by accurately sensing a traveling state of a cleaner and properly taking a step when the cleaner cannot normally travel.

To achieve these and other advantages and in accordance with the purpose of the present invention, as embodied and broadly described herein, there is provided a robot cleaner comprising a suction unit installed within a cleaner body, for sucking dirt on a floor; a driving unit for moving the cleaner body; a wheel installed at a bottom of the cleaner body to be contacted with the floor, and rotated by movement of the cleaner body; a detecting unit for detecting whether the wheel is rotated; and a control unit for controlling the driving unit in response to signal from the detecting unit.

To achieve these and other advantages and in accordance with the purpose of the present invention, as embodied and broadly described herein, there is provided an operating method of a robot cleaner comprising a first step of carrying out cleaning operation by moving by itself and sucking dirt on a floor; a second step of detecting whether the cleaner normally travels by sensing whether a wheel supporting the cleaner on a floor and rotated by movement of the cleaner is rotated; and a third step of extricating the cleaner from a place where rotation stoppage of the wheel is detected in the second step.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification; illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
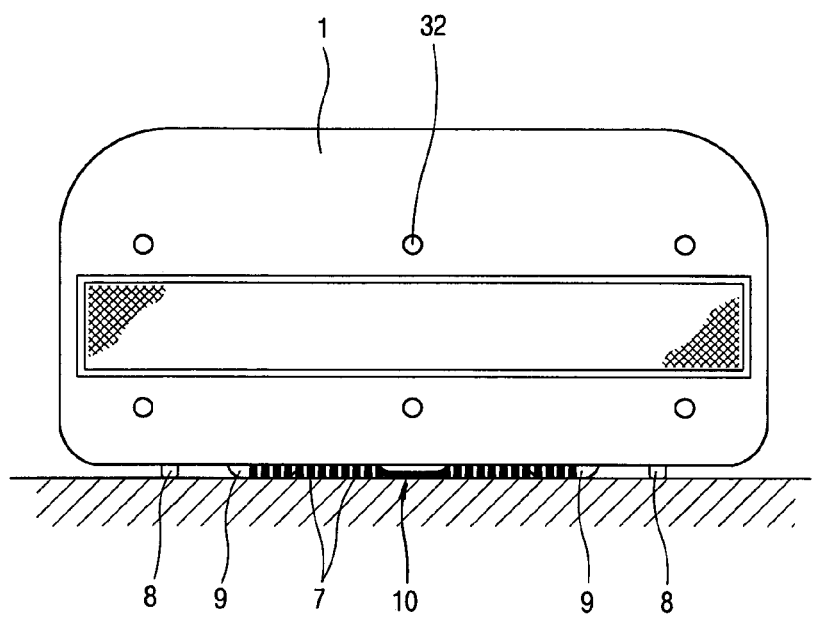
FIG. 1 is a view showing a front side of a robot cleaner in accordance with the present invention.
Figure 2:
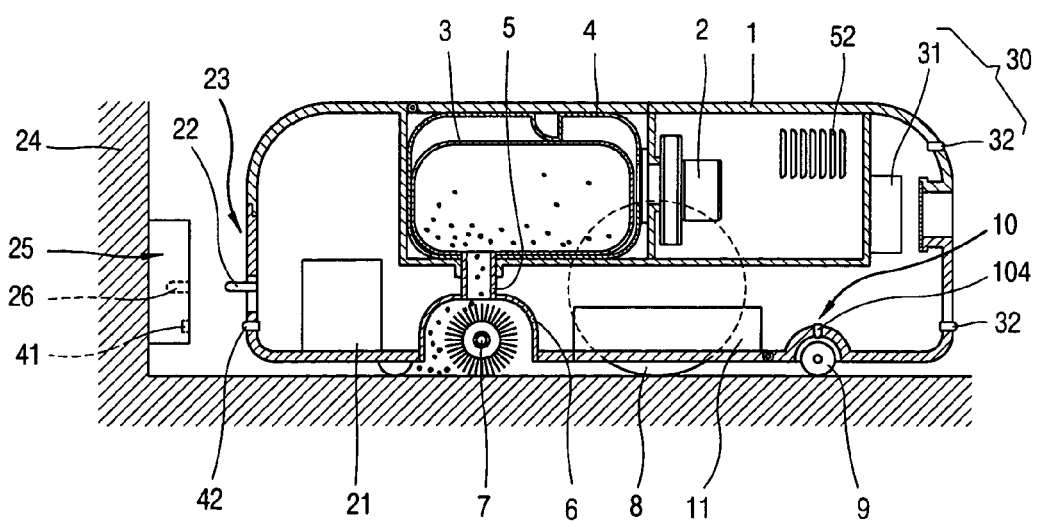
FIG. 2 is a sectional view showing a robot cleaner in accordance with the present invention.
Figure 3:
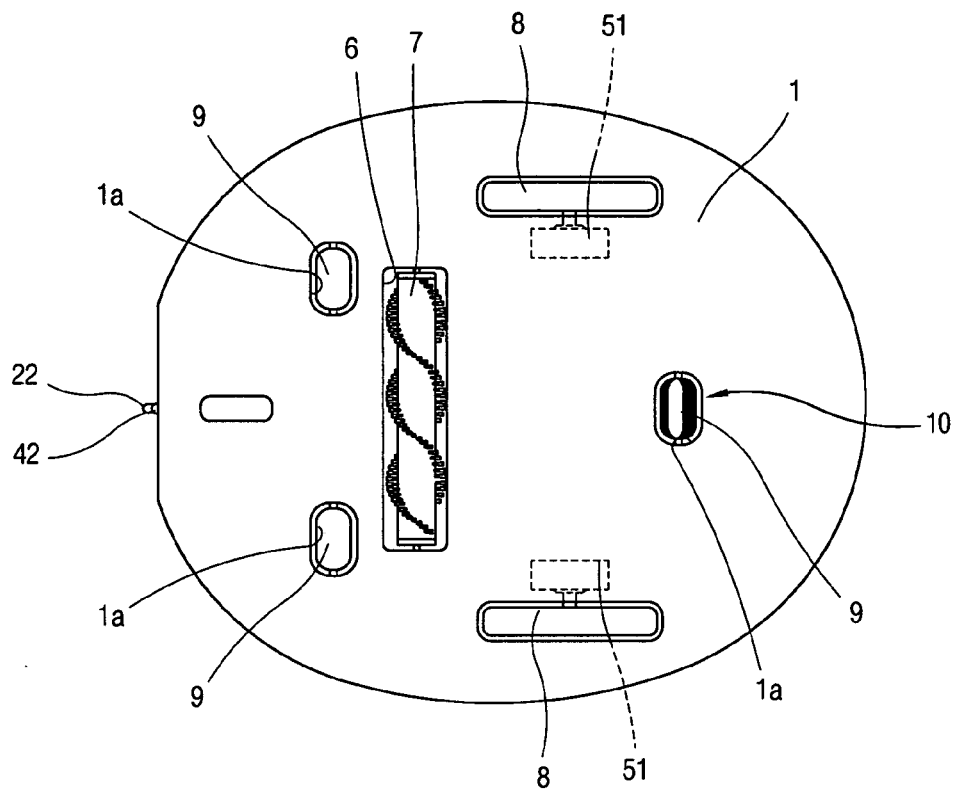
FIG. 3 is a view showing a bottom of a robot cleaner in accordance with the present invention.

As shown in FIGS. 1 through 3, a robot cleaner in accordance with the present invention includes: a fan motor 2 installed inside a cleaner body 1 and for generating a suction force; a filter container 4 having a filter 3 installed at in the vicinity of the fan motor 2 and filtering dirt sucked by the fan motor 2; a suction head 6 provided at a lower portion of the body, connected to the filter container 4 by a connection pipe 5 and through which dirt on a floor is sucked; a brush 7 rotatably disposed in the suction head 6 and for brushing dirt attached on a floor; an exhaust opening 52 formed at one side of the body 1 and through which filtered air is exhausted; at least one navigation sensor 30 installed at one side of the cleaner body and for determining a position of a cleaner and a position of an obstacle or the like; a driving wheel 8 rotatably installed at the body 1; a driving motor 51 for rotating the driving wheel 8; at least one auxiliary wheel 9 installed on a bottom of the cleaner body 1 to support the cleaner body on a floor, and idling by movement of the cleaner body 1; a detecting unit 10 for sensing whether the auxiliary wheel 9 is rotated, to thereby sense a traveling state of a cleaner; and control unit 11 for controlling operation of each element and also controlling the driving motor by receiving a signal of the detecting unit 10.

In addition, a battery 21 charged and discharged is installed inside the cleaner body 1. A charging terminal unit 23 is provided at a rear surface of the body 1 and includes a charging terminal 22 connected to a connection terminal 26 of a power terminal unit 25 installed on a wall 24 of a room and for charging the battery 21. In addition, a light-emitting unit 41 is installed at a lower portion of the power terminal unit 25 and emits an optical signal for inducing the cleaner body 1 toward the power terminal unit 25, and a light-receiving unit 42 is installed at a lower portion of the charging terminal unit 23 and receives the optical signal emitted from the light-emitting unit 41.

The navigation sensor 30 includes an ultrasonic wave transmitting unit 31 installed at a front central portion in the cleaner body 1 and for transmitting ultrasonic waves; and ultrasonic wave receiving units 32 respectively installed at upper and lower sides of the ultrasonic waves transmitting unit 31 and for sensing ultrasonic waves reflected by an obstacle or the like.

Figure 4:
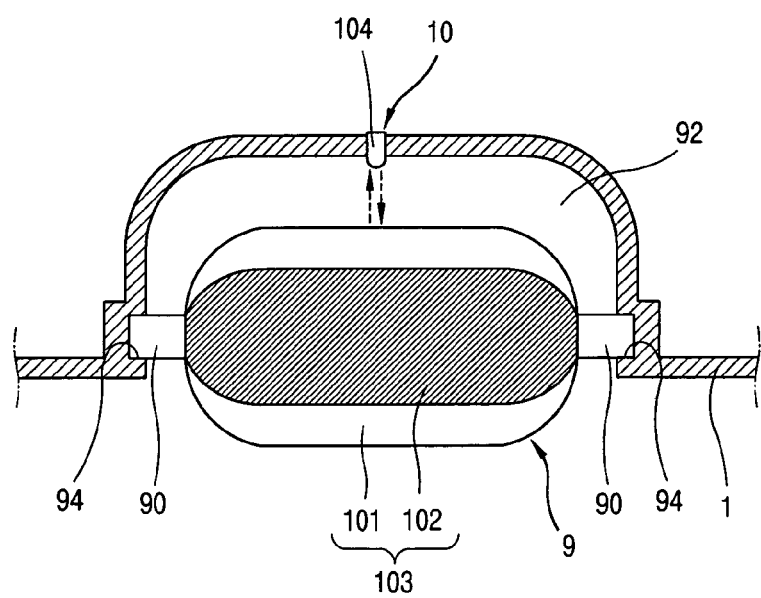
FIG. 4 is a partially sectional view showing a detecting unit provided in a robot cleaner in accordance with the present invention.

As depicted in FIG. 4, the auxiliary wheel 9 is formed in a bar shape with a round section, and is rotatably installed at the cleaner body 1 in such a manner that its certain portion is inserted into a recessed portion 92 formed by recessing a bottom of the body 1, protruded portions 90 formed protruded from both ends of the auxiliary wheel 9 are inserted into insertion grooves 94 formed both sides of an inner circumferential surface of the recessed portion 92, respectively. Accordingly, the auxiliary wheel 9 is rotated in a state of being in contact with the floor at all times in traveling of the cleaner. Herein, the auxiliary wheel 9 is not limited to the mentioned shape or an installation method, but may be formed and installed in various types.

The detecting unit 10 includes an indicating means 103 formed as materials having optical reflectivity variation or optical absorptance different from each other are sequentially applied onto an outer circumferential surface of the auxiliary wheel 9 in a circumferential direction; and an optical sensor 104 installed at one side of the auxiliary wheel 9, irradiating light to the indicating means 103, then sensing the reflected light, and outputting a sensing signal to the control unit 11. The indicating means 103 consists of a white coated layer 101 and a black coated layer 102 alternately applied onto the outer circumferential surface of the auxiliary wheel 9.

The detecting unit 10 is not limited to being installed at the auxiliary wheel 9 for supporting the cleaner body as above, but may be installed at a rolling means which is separately provided and slidingly rotated on the floor by movement of the cleaner body 1.

Since the auxiliary wheel 9 is rotated when the cleaner normally travels, the optical sensor 104 of the detecting unit 10 recognizes change of reflected light alternately reflected from the white coated layer 101 and the black coated layer 102, and then the control unit 11 determines that the cleaner normally travels. In addition, since the driving wheel 8 slidingly is rotated on the floor or the auxiliary wheel 9 is not rotated in case that the cleaner abnormally travels, the optical sensor recognizes that the reflected light reflected from the white coated layer 101 and the black coated layer 102 is not changed. Then, the control unit 11 compares a sensing signal and a preset value, determines that the cleaner abnormally travels, and outputs a signal for properly taking a step.

When a robot cleaner in accordance with the present invention constructed as above is operated by a user, the control unit 11 and the navigation sensor 30 are operated, and the driving wheel 8 connected to the driving motor 51 is rotated. Then, the cleaner travels a cleaning zone along a set pattern, and simultaneously the fan motor 2 is driven. Accordingly, a cleaning operation is carried out by sucking dirt on a floor to the filter 3 through a suction head 6 and a connection pipe 5, and then filtering the introduced dirt.

But, in case that the cleaner cannot normally travel because of being caught by an obstacle which has not been previously recognized in traveling, the detecting unit 10 detects whether the auxiliary wheel 9 is rotated and thus determines a state of the cleaner stopped by an obstacle. And the control unit 11 receives a signal of the detecting unit 10 and thus controls the driving motor 51, to automatically extricate the cleaner from an area with obstacle.

Figure 5:
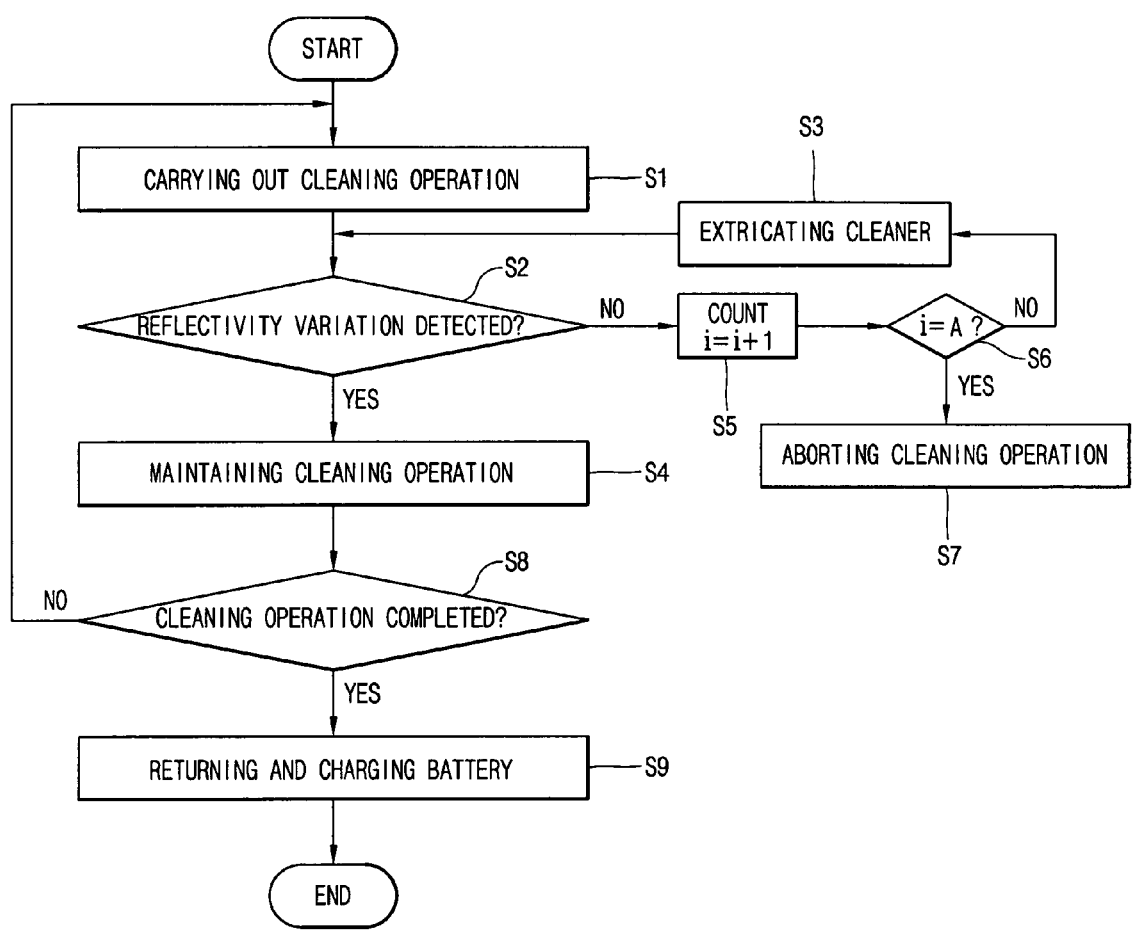
FIG. 5 is a flow chart sequentially showing operation of a robot cleaner in accordance with the present invention.

Hereinafter, sequential operation of the robot cleaner as above will now be described step by step with reference to FIG. 5. In the drawing, the letter 'S' means each step.

First, when a user operates a switch of a cleaner, the cleaner travels a cleaning zone along a set pattern, performing a cleaning operation (S1).

While the cleaner performs a cleaning operation in the cleaning zone, the detecting unit 10 senses whether the auxiliary wheel 9 is rotated. That is, an optical sensor 104 of the detecting unit 10 senses change of the amount of light reflected from the indicating means 103 (S2).

At this time, if there is a change in optical reflectivity variation inputted to the optical sensor 104, it means that the cleaner body 1 is traveling. Therefore, a cleaning operation is maintained (S4).

On the other hand, if there is no change in optical reflectivity variation inputted to the optical sensor 104, it means that the cleaner is stopped by an obstacle. Therefore, an operation of extricating the cleaner from a current position is performed. That is, an attempt is made to extricate the cleaner from a place where the cleaner cannot move because of an obstacle, by reversely rotating a driving wheel 8 connected to the driving motor 41 for prescribed time (S3).

And after the operation of extricating the cleaner has been performed, the detecting unit 10 senses whether an auxiliary wheel 9 is rotated. At this time, if the optical sensor senses a change in optical reflectivity variation, a cleaning operation is performed again. But, if the optical sensor senses no change in optical reflectivity variation, operation of extricating the cleaner is performed again. Herein, whenever the operation of extricating the cleaner is performed, the number of the operation is counted (S5). And, the counted value is compared with a preset value (A) (S6). Herein, when the number of operation of extricating the cleaner is not the same as a set value (A), the operation of extricating the cleaner is performed, and when the number is the same as the set value (A), the operation of the cleaner is aborted (S7). That is, when the cleaner is not extricated from an area where the cleaner cannot proceed by an obstacle even though the operation of extricating the cleaner from that area is performed several times, the operation of the cleaner is aborted, thereby preventing unnecessary power consumption and excessive operation of elements.

On the other hand, after the cleaning operation is performed without abortion of traveling of the cleaner, the control unit 11 determines whether a cleaning operation of a cleaner has been completed (S8). If the cleaning operation has not been completed, the cleaning operation is performed again. If the cleaning operation has been completed, the cleaner returns to the power terminal unit 25, and a battery 21 is charged (S9).

As so far described, the robot cleaner in accordance with the present invention can smoothly and continuously carry out a cleaning operation, even when the robot cleaner is abnormally stopped due to an obstacle which is not previously recognized in traveling.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A robot cleaner, comprising:
   a suction unit provided at a cleaner body, for sucking dirt on a floor;
   a driving wheel installed at the cleaner body and rotated by the driving motor to move the cleaner body;
   at least one auxiliary wheel installed at a bottom of the cleaner body, for supporting the cleaner body on the floor in a state of being in contact with the floor, and rotated by movement of the cleaner body; and
   a detector installed near the auxiliary wheel for detecting whether the auxiliary wheel is rotated.

2. The robot cleaner of claim 1, wherein the detector comprises:
   an indicator formed as materials having optical absorbance different from each other alternately applied onto an outer circumferential surface of the auxiliary wheel in a circumferential direction; and
   an optical sensor installed near the auxiliary wheel, for emitting light to the indicator and for sensing reflectivity variation of ligth reflected from the indicator.

3. The robot cleaner of claim 1,
   wherein the auxiliary wheel is rotatably installed at the cleaner body in such a manner that a partial portion of the auxiliary wheel is inserted into a recessed portion formed in a bottom of the cleaner body, and protruded portions protruded from both ends of the auxiliary wheel are inserted into insertion grooves formed at both sides of an inner circumferential surface of the recessed portion.

4. An operating method of a robot cleaners, comprising:
   carrying out a cleaning operation by independently moving and sucking dirt on a floor;
   detecting whether the cleaner normally travels by sensing whether a wheel supporting the cleaner on a floor and rotated by movement of the cleaner is rotated; and
   extricating the cleaner from a place where a rotation stoppage of the wheel is detected in the detecting.

5. The method of claim 4, further comprising:
   maintaining a cleaning operation by independently moving and sucking dirt on the floor, when the rotation of the wheel is detected in the detecting which is performed after the extricating.

6. The method of claim 4, further comprising:
   aborting the operation of the cleaner, when the rotation stoppage of the wheel is detected after the detecting and the extricating are repeatedly performed more than a predetermined number of times.

7. The method of claim 4,
   wherein the detecting is performed by emitting light to the wheel and sensing a variation of the light reflected from the wheel by an optical sensor.

8. The method of claim 4,
   wherein the extricating is performed by reversely rotating a driving motor for moving the cleaner so as to move the cleaner in a direction opposite to a predetermined traveling direction of the cleaner.

* * * * *

UNITED STATES PATENT AND TRADEMARK OFFICE
CERTIFICATE OF CORRECTION

PATENT NO. : 7,359,766 B2  Page 1 of 1
APPLICATION NO. : 10/837666
DATED : April 15, 2008
INVENTOR(S) : H. Jeon et al.

It is certified that error appears in the above-identified patent and that said Letters Patent is hereby corrected as shown below:

At column 5, line 25 (claim 2, line 9) of the printed patent, "ligth" should be --light--.

At column 6, line 1 (claim 4, line 1) of the printed patent, "cleaners" should be --cleaner--

Signed and Sealed this

Nineteenth Day of August, 2008

JON W. DUDAS
*Director of the United States Patent and Trademark Office*